Metzger, Roraback & Flint
Stump Extractor.

Nº 86,994.  Patented Feb. 16, 1869.

Witnesses:
Wm A Morgan
Ch. C. Dieterich

Inventors;
Chas Metzger
Geo Roraback
Geo Flint
per Munn & Co

CHARLES METZGER, GEORGE R. RORABACK, AND GEORGE FLINT, OF DE SOTO, MISSOURI.

Letters Patent No. 86,994, dated February 16, 1869.

IMPROVED STUMP-EXTRACTOR.

The Schedule referred to in these Letters Patent and making part of the same

*To all whom it may concern:*

Be it known that we, CHARLES METZGER, GEORGE R. RORABACK, and GEORGE FLINT, of De Soto, in the county of Jefferson, and State of Missouri, have invented a new and improved Stump-Extractor; and we do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
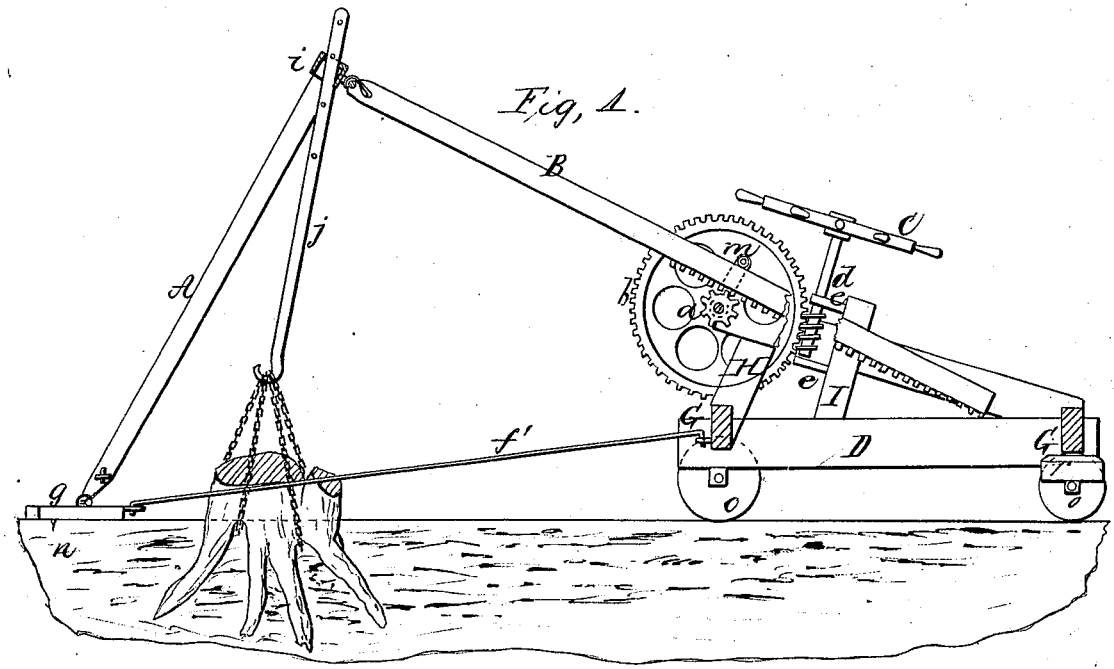
Figure 1 is a sectional view of our invention through the line *x x* of fig. 2.
Figure 2:
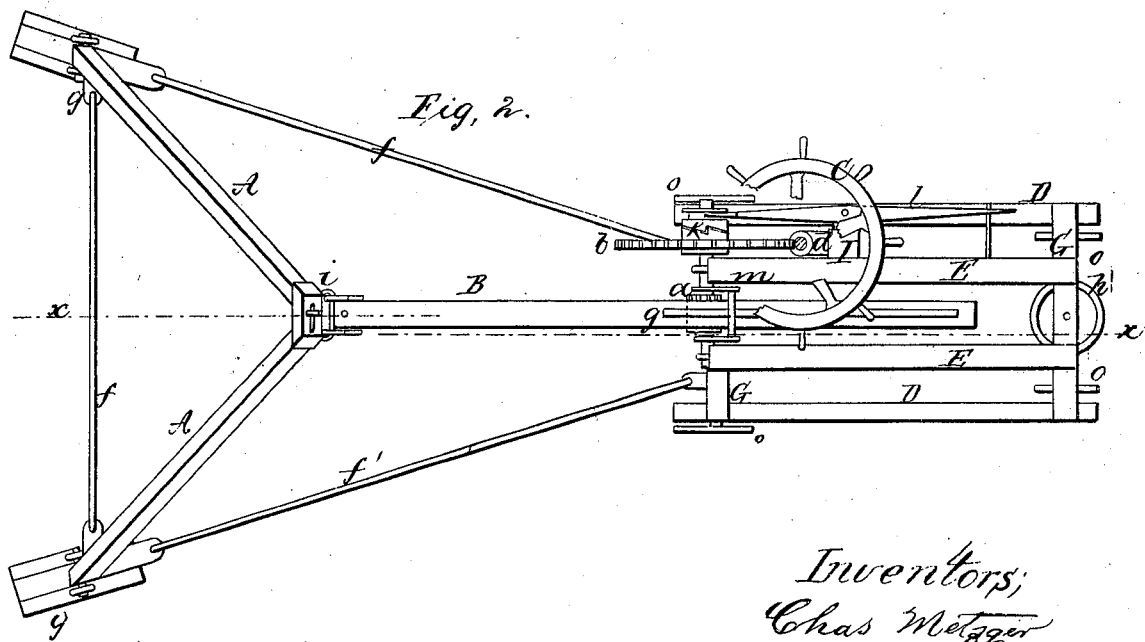
Figure 2 is a plan view of the same.

The object of this invention is to provide an apparatus for extracting stumps, which is simple, portable, and effective.

It consists, in general terms, of a tripod of stout timbers, one leg of which bears a rack, which is engaged by a pinion, forming part of the mechanism to which the power is applied.

This mechanism is arranged within or upon a suitable frame, which latter is connected with the two other legs of the tripod by iron rods, to keep them from spreading from the machine, when strain is brought upon them. The said legs are also connected with each other in the same manner, and for a similar reason.

The mechanism for actuating the tripod consists of a hand-wheel, mounted on the upper end of a screw-threaded shaft, which engages with a large toothed wheel in the shaft of the pinion, engaging with the rack on one of the legs of the tripod, so that as the said hand-wheel is turned, the leg bearing the rack is pushed forward to bring the other two legs, with which it is connected at the vertex, more vertical. The stump being connected with the vertex of the tripod is therefore subjected to a raising strain, which accomplishes its extraction in one or more of these operations.

Other devices, perfecting the whole, render this machine of practical utility, and conveniently operated.

In the drawings—

A A are the equal legs of the tripod.

B is a long leg, bearing a rack on its under side, as shown.

*a* is the pinion, engaging with the said rack.

*b* is the large toothed wheel, on the shaft of the said pinion.

*d* is the screw-threaded shaft of the hand-wheel C.

D E E D G G H is the frame, affording support and bearings for the gearing-mechanism, as shown.

The leg B moves between the inclined timbers E E of the frame.

I is an upright, affixed to the frame, to afford attachment for the bearings *e e* of the screw-shaft *d*.

*f f' f'* are the rods, which prevent the legs of the tripod from spreading.

*g g* are foot-blocks for the legs A A, to afford a broader bearing for the same.

The rods *f' f'* are hooked into plates *h h*, affixed to the said first blocks, as shown, and also into eye-bolts on the cross-timbers G, as shown.

The rod *f* is hooked in eye-bolts or plates on the legs, near the bottom of the same.

The three rods are detachable, so that the tripod can be taken down, to be packed in smaller compass, when the apparatus is to be removed to a distant field of operations.

The upper ends of the legs A A fit into a metal cap, *i*, which is slotted or perforated to receive the chain-bar or rod *j*, which latter is provided with a number of holes and a key-pin, to take up the slack of the stump-chain, at each successive raising, where more than one raising is necessary to extract the stump.

The upper end of the leg B is notched, to bear against the vertex-plate *i*, without slipping from it, the said plate being provided with a corresponding projection to fit in the notch of the leg.

The lower ends of the legs A A are also notched, and fit on projections from the foot-blocks for the same purpose.

The stump-chain is passed around or under the stump, in any convenient manner, and the several parts are held within a hook in the lower end of the rod *j*, as shown, thus bringing the stump within the legs of the tripod.

The rod is said to take up the slack of the stump-chain, and the key-pin inserted in the proper hole.

Now, the hand-wheel C, being turned in the right direction, causes the leg B to raise the legs A A to a more vertical position, thus bringing a raising-strain upon the stump.

Large stumps will require several raisings, in which case the leg B is suffered to run back after the legs A A have been brought to a vertical position; and to avoid the slow operation of turning back the wheel C, a clutch-coupling device, *k*, is provided, which engages with a corresponding clutch-hub of the wheel *b*, which latter is loose on the shaft.

The clutch is moved on the shaft by the lever *l*, and is drawn from engagement with the wheel *b*, when the tripod is to be lowered for a new raising, when the leg B will run back between the timbers E E, thus lowering the legs A A.

The rod *j* is again shifted up another hole, the clutch *k* put in gear, and the raising-operation continued.

The foot-blocks *g* may be provided with spike-studs *n*, to obtain a better hold upon the ground.

The leg B is held in engagement with the pinion *a*, on which it rides, by means of a yoke, *m*, bearing a roller, and a strip of metal, *q*, is let into the upper side of the leg B, to enable it to move upon the said roller with less friction.

The frame A is mounted on trucks *o o o o*, the axle of the front two being affixed to a fifth-wheel, $p$, so as to guide the machine when being drawn from place to place.

A tongue should, in practice, be affixed to the front axle.

The tripod is not taken down, in moving from one stump to the next, but is simply drawn along standing, and the foot-blocks may be provided with small rollers, to facilitate moving, which rollers will be pressed down into the soil when strain is brought upon the tripod.

When the machine is to be transferred to a distant field, the tripod is taken down, and the three legs laid on the cross-timbers G G, and against the timbers H and E, on the side opposite the clutch, the stay-rods lying on top of the legs.

The truck-axles should be of the ordinary road-gauge.

Having thus described our invention,

We claim as new, and desire to secure by Letters Patent—

1. The combination, in a stump-extracting machine, of a tripod, A A B, stayed with foot-rods $f\ f'\ f'$, and provided with foot-blocks $g\ g$, with the hand-wheel C, screw-shaft $d$, wheel $b$, and pinion $a$, all as set forth.

2. The employment of the rod $j$, substantially as described, in combination with the tripod A A B, and the gearing for actuating the latter, all as set forth.

3. The frame D D E E G G, and the trucks $o\ o\ o\ o$, in combination with the stump-extracting tripod A A B, all as set forth.

4. The clutch-coupling K, wheel $b$, pinion $a$, hand-wheel C, and screw-shaft $d$, when combined with the tripod A A B, substantially as described.

CHARLES METZGER.
GEO. R. RORABACK.
GEORGE FLINT.

Witnesses:
B. S. REPPY,
LEWIS B. BEACH.